(12) United States Patent
Nakano

(10) Patent No.: US 6,655,751 B2
(45) Date of Patent: Dec. 2, 2003

(54) METHOD OF CONTROLLING VEHICLE HYDRAULIC BRAKE SYSTEM

(75) Inventor: Keita Nakano, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 13 days.

(21) Appl. No.: 09/851,154

(22) Filed: May 9, 2001

(65) Prior Publication Data

US 2001/0048243 A1 Dec. 6, 2001

(30) Foreign Application Priority Data

May 24, 2000 (JP) .................................. 2000-152414

(51) Int. Cl.[7] .......................... B60T 08/34; B60T 08/40; B60T 13/18
(52) U.S. Cl. .................. 303/11; 303/113.4; 303/116.1; 303/DIG. 2
(58) Field of Search .............. 303/10, 11, 15, 303/157, 158, 166, 167, 113.1, 113.4, 116.1, 119.1, DIG. 1, DIG. 2, 3

(56) References Cited

U.S. PATENT DOCUMENTS

| | | | |
|---|---|---|---|
| 4,569,560 A | | 2/1986 | Kubo ....................... 303/116.1 |
| 4,611,859 A | * | 9/1986 | Otsuki et al. ............. 303/116.1 |
| 4,680,713 A | | 7/1987 | Kubo .......................... 303/176 |
| 4,714,299 A | * | 12/1987 | Takata et al. ............ 188/181 A |
| 4,872,730 A | * | 10/1989 | Takagi et al. ............. 303/113.2 |
| 4,872,731 A | * | 10/1989 | Nakamura ..................... 303/10 |
| 5,005,917 A | * | 4/1991 | Yahagi et al. ............. 303/113.1 |
| 5,195,810 A | * | 3/1993 | Ocvirk et al. .................. 303/11 |
| 5,358,320 A | * | 10/1994 | Fuchida ................... 303/116.1 |
| 5,368,374 A | | 11/1994 | Fujimoto ................. 303/113.2 |
| 5,375,506 A | | 12/1994 | Hashida et al. ........... 303/117.1 |
| 5,474,371 A | | 12/1995 | Shinomiya | |
| 5,727,851 A | * | 3/1998 | Ohkubo et al. ........... 303/116.1 |
| 5,967,628 A | * | 10/1999 | Abe et al. .................... 188/353 |
| 6,089,679 A | * | 7/2000 | Kushi et al. ................. 188/195 |
| 6,183,050 B1 | * | 2/2001 | Ganzel ......................... 188/358 |
| 6,315,371 B1 | * | 11/2001 | Wachi et al. ................... 303/11 |
| 6,328,391 B1 | * | 12/2001 | Iwata et al. .................... 303/10 |
| 6,371,576 B2 | * | 4/2002 | Nakano .................... 303/113.3 |

FOREIGN PATENT DOCUMENTS

| | | |
|---|---|---|
| DE | 3417587 | 11/1984 |
| GB | 2297813 | 8/1996 |
| JP | 2590825 | 1/1988 |
| JP | 2000-16278 A | * 1/2000 |
| JP | 2000-85567 | 3/2000 |

OTHER PUBLICATIONS

US2001/0026097A1 to Nakano.*
US2002/0022918A1 to Nakano.*
1 English Language Abstract of JP 2590825.
2 English Language Abstract of JP 2000–85567.

* cited by examiner

Primary Examiner—Christopher P. Schwartz
Assistant Examiner—Melody M. Burch
(74) Attorney, Agent, or Firm—Greenblum & Bernstein, P.L.C.

(57) ABSTRACT

A control method of a hydraulic pressure source-driven type vehicle hydraulic pressure brake system in which no irritating noises or vibrations are produced during stoppage of the vehicle and which does not consume electric power in waste. When the vehicle stops and the surroundings become quiet, by detecting stoppage of the vehicle by a sensor for detecting the rotation of a wheel, stopping a motor for a pump for producing brake hydraulic pressure, and opening a solenoid valve in a master cylinder passage bringing the master cylinder and the wheel cylinder into communication with each other, it is possible to prevent noises or vibrations from the motor and wasteful consumption of electric power.

6 Claims, 3 Drawing Sheets

METHOD OF CONTROLLING VEHICLE HYDRAULIC BRAKE SYSTEM

BACKGROUND OF THE INVENTION

This invention relates to a method of controlling a vehicle hydraulic brake system which is provided with a hydraulic pressure source for producing brake hydraulic pressure and in which the hydraulic pressure produced in the master cylinder can also be used as brake hydraulic pressure.

In recent years, in order to realize sophisticated behavior control of the vehicle and get a light brake feeling, as described e.g. in Japanese patent publication 2590825, a vehicle hydraulic brake system is employed in which a hydraulic pressure source for producing brake hydraulic pressure is provided, and a driving device for the hydraulic pressure source is actuated based on a detection signal from a brake operating force detecting means for detecting the operating force of a brake operating member.

Among such hydraulic pressure source-driven type brake systems, there are many in which a master cylinder for producing hydraulic pressure corresponding to the operating force applied to the brake operating member is in communication with wheel cylinders through an on-off valve in a so-called master cylinder passage, and when the hydraulic pressure source is not operating normally, the hydraulic pressure in the master cylinder is transmitted as brake hydraulic pressure by opening the on-off valve to provide a failsafe function.

Among such hydraulic pressure source-driven type brake systems, there are ones in which in order to impart brake feelings of a conventional type brake system to a driver, a stroke simulator for producing mock brake hydraulic pressure is provided in communication with the master cylinder. The stroke simulator has a brake fluid absorbing chamber communicating with the master cylinder and is adapted to produce mock brake hydraulic pressure in the master cylinder by producing a back pressure in the brake fluid absorbing chamber.

With such a conventional hydraulic pressure source-driven type of brake system, even when the vehicle is stopped, while the vehicle driving devices such as the engine or motor is idling, control of the brake system is still carried out. Thus, with brake operations, the driving device for the hydraulic pressure source is still activated. When the vehicle stops and the surroundings become quiet, noises and vibrations resulting from the separation of the driving device irritate people. Also, for the operation of the driving device, electric power is wasted.

An object of this invention is therefore to provide a control method of a hydraulic pressure source-driven type vehicle hydraulic pressure brake system in which no irritating noises or vibrations are not produced during a stop of the vehicle and which does not waste electric power.

SUMMARY OF THE INVENTION

According to this invention, there is provided a method of controlling a vehicle hydraulic brake system comprising a brake operating member, a master cylinder for producing hydraulic pressure corresponding to a brake operating force applied to the brake operating member, a wheel cylinder, a hydraulic pressure source for producing brake hydraulic pressure in the wheel cylinder, a driving device for the hydraulic pressure source, a fluid passage bringing the hydraulic pressure source and the wheel cylinder into communication with each other, a master cylinder passage bringing the master cylinder and the wheel cylinder into communication with each other through an on-off valve, a relief passage communicating the master cylinder with the wheel cylinder through an on-off valve, and a brake operating force detecting means for detecting the brake operating force applied to the brake operating member, wherein while the hydraulic pressure source functions normally, the on-off valve in the master cylinder passage is closed, and the driving device for the hydraulic pressure source is actuated based on the detection signal from the brake operating force detecting means, characterized in that a vehicle stoppage detecting means for detecting stoppage of the vehicle is provided, and when the vehicle stoppage detecting means detects stoppage of the vehicle, the driving device for the hydraulic pressure source is stopped and the on-off valve in the master cylinder passage is opened.

That is to say, when the vehicle stops, by stopping the driving device for the hydraulic pressure source of the brake system and and opening the on-off valve in the master cylinder passage to bring the master cylinder and the wheel cylinder into communication with each other as in a conventional type brake systems to transmit the master cylinder hydraulic pressure to the wheel cylinder as brake hydraulic pressure, no irritating noises or vibrations will be produced, and electric power will not be wasted.

By providing a master cylinder hydraulic pressure detecting means for detecting hydraulic pressure produced in the master cylinder, and a brake hydraulic pressure detecting means for detecting the brake hydraulic pressure in the wheel cylinder, and by opening the on-off valve in the master cylinder passage, if the pressure difference between the hydraulic pressure in the master cylinder detected by the master cylinder hydraulic pressure detecting means and the brake hydraulic pressure detected by the brake hydraulic pressure detecting means is below a predetermined threshold, it is possible to prevent sharp reverse flow of brake fluid from the wheel cylinder into the master cylinder, sharp outflow of brake fluid from the master cylinder into the wheel cylinder, a kickback in the brake operating member, or sinking of the brake operating member, all resulting from the opening of the on-off valve in the master cylinder passage.

By opening the on-off valve in the relief valve when the release of the brake operating member is detected by the detection signal from the brake operating force detecting means, or by a detection signal from a separately provided brake operating amount detecting means for detecting the brake operating amount of the brake operating member, it is possible to discharge brake fluid in the wheel cylinder into the relief passage and prevent excess brake fluid from flowing back into the master cylinder from the master cylinder passage. If excess brake fluid flows back into the master cylinder, residual pressure may be produced in the master cylinder after release of brake operation, thus damaging the cup seal of the master cylinder.

By providing a stroke simulator having a brake fluid absorbing chamber into communication with the master cylinder, providing a master cylinder hydraulic pressure detecting means for detecting the hydraulic pressure produced in the master cylinder, a brake hydraulic pressure detecting means for detecting the brake hydraulic pressure in the wheel cylinder, and a brake operating amount detecting means for detecting the brake operating amount of the brake operating member, opening the on-off valve in the relief passage when an operation tending toward release of the brake operating member is detected by the detection signal of the brake operating amount detecting means, and controlling the degree of opening of the on-off valve in the relief passage such that the hydraulic pressure in the master cylinder detected by the master cylinder hydraulic pressure detecting means, or the brake hydraulic pressure detected by the brake hydraulic pressure detecting means becomes a predetermined hydraulic pressure corresponding to the brake operating amount detected by the brake operating amount detecting means, it is possible to prevent excess brake fluid from flowing back into the master cylinder from the master cylinder passage, and get the same brake feeling as during traveling even after stoppage of the vehicle.

Other features and objects of the present invention will become apparent from the following description made with reference to the accompanying drawings, in which:

DETAILED DESCRIPTION OF THE PREFERRED EMBODIMENT

Figure 1:
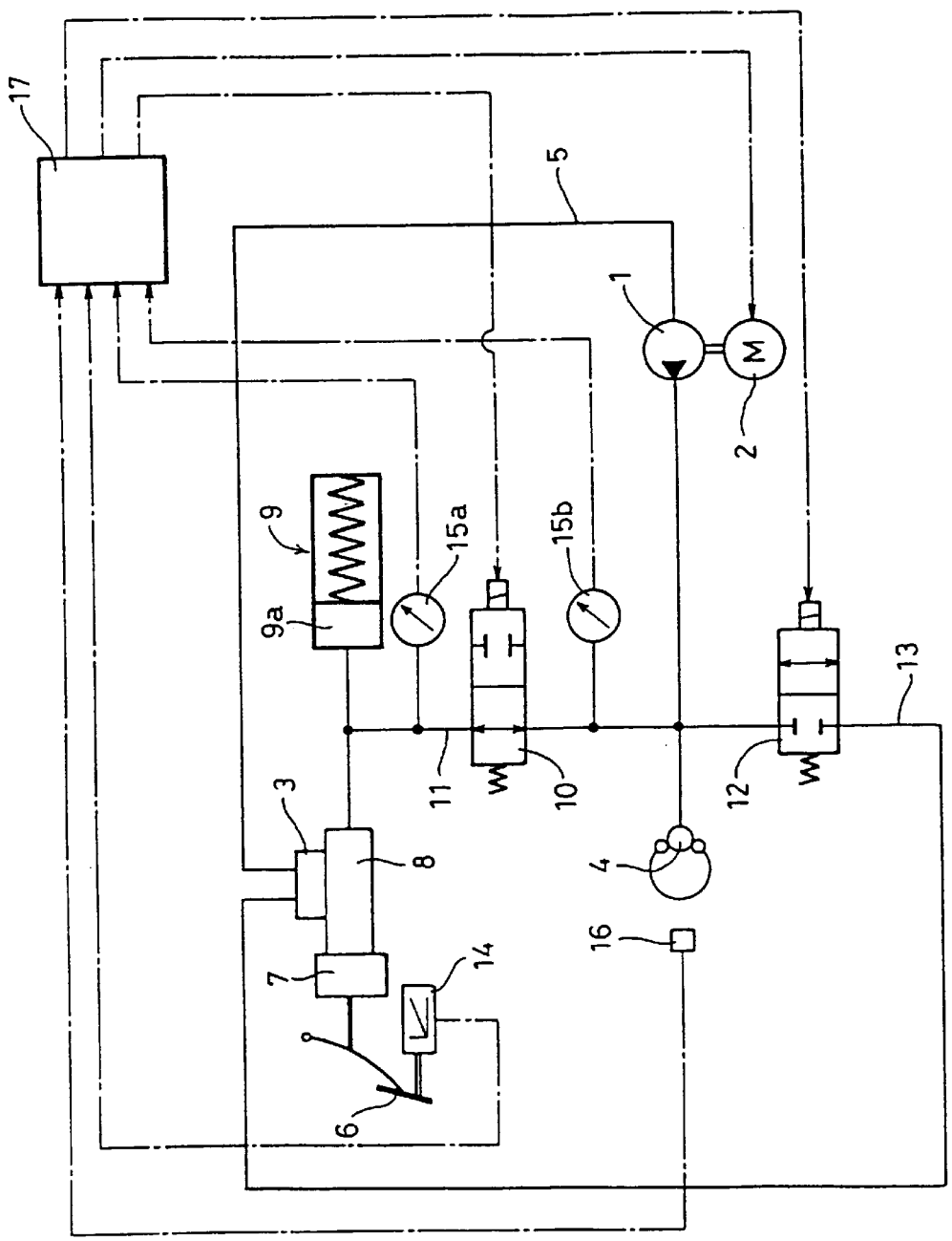
FIG. 1 is a circuit diagram showing a brake system to which is applied a control method of a first embodiment.

Hereinbelow, with reference to the drawings, the embodiments of this invention will be described. FIG. 1 shows a vehicle hydraulic brake system to which the control method of the first embodiment is applied. This brake system has a pump 1 as a hydraulic pressure source and a motor 2 as a driving device thereof. The pump 1 is mounted in a fluid passage 5 through which a reservoir tank 3 and a wheel cylinder 4 communicate with each other. A brake pedal 6 as a brake operating member is coupled to a master cylinder 8 through a booster 7. The master cylinder 8 communicates with a brake fluid absorbing chamber 9a of a stroke simulator 9. Also, the master cylinder 8 and the wheel cylinder 4 communicate with each other through a solenoid valve 10, which is an on-off valve, in a master cylinder passage 11. Between the wheel cylinder 4 and the reservoir tank 3, a relief passage 13 for brake fluid is provided in which is mounted a solenoid valve 12 as an on-off valve.

To the brake pedal 6, a stroke sensor 14 as a brake operating amount detecting means for detecting its step-in amount is mounted. In the master cylinder passage 11, a pressure sensor 15a for detecting the hydraulic pressure PM in the master cylinder 8, which is also a brake operating force detecting means, and a pressure sensor 15b for detecting the brake hydraulic pressure PW in the wheel cylinder 4 are mounted. Near the wheel (not shown), a sensor 16 for detecting the wheel rotation is mounted. Detection signals from the sensors 14, 15a, 15b, and 16 are entered into a controller 17. Based on these detection signals, the motor 2 and the solenoid valves 10 and 12 are actuated.

Hereinbelow, it will be described how the brake system is controlled by the controller 17 when stopping the vehicle. In a normal travel state, by closing the solenoid valve 10 to close the master cylinder passage 11 and actuating the motor 2 and the solenoid valve 12 based on the master cylinder hydraulic pressure PM as the brake operating force, which is detected by the pressure sensor 15a, a suitable brake hydraulic pressure PW is produced in the wheel cylinder 4.

But if, for some reason, brake fluid supplied to the wheel cylinder 4 becomes insufficient, and the controller 17 detects that the brake hydraulic pressure PW detected by the pressure sensor 15b is insufficient, the solenoid valve 10 in the master cylinder passage 11 will be opened to transmit the master cylinder hydraulic pressure PM to the wheel cylinder 4 to produce a sufficient brake hydraulic pressure PW.

When the vehicle stops, the controller 17 detects the stoppage of the vehicle by the detection signal from the sensor 16, stops the motor 2 and opens the solenoid valve 10 when the hydraulic pressure difference between the master cylinder hydraulic pressure PM and the brake hydraulic pressure PW, which are detected by the pressure sensors 15a and 15b, respectively, drops below a predetermined threshold 0.2 MPa to bring the master cylinder 8 and the wheel cylinder 4 into communication with each other. Thus, even when the vehicle stops and the surroundings become quiet, noises or vibrations from the motor 2 will not be produced.

Further, when depressing of the brake pedal 6 is relaxed, the controller 17 detects an operation toward the release of the brake by the detection signal from the stroke sensor 14, and opens the solenoid valve 12 to release brake fluid in the wheel cylinder 4 into the relief passage 13.

Figure 2:
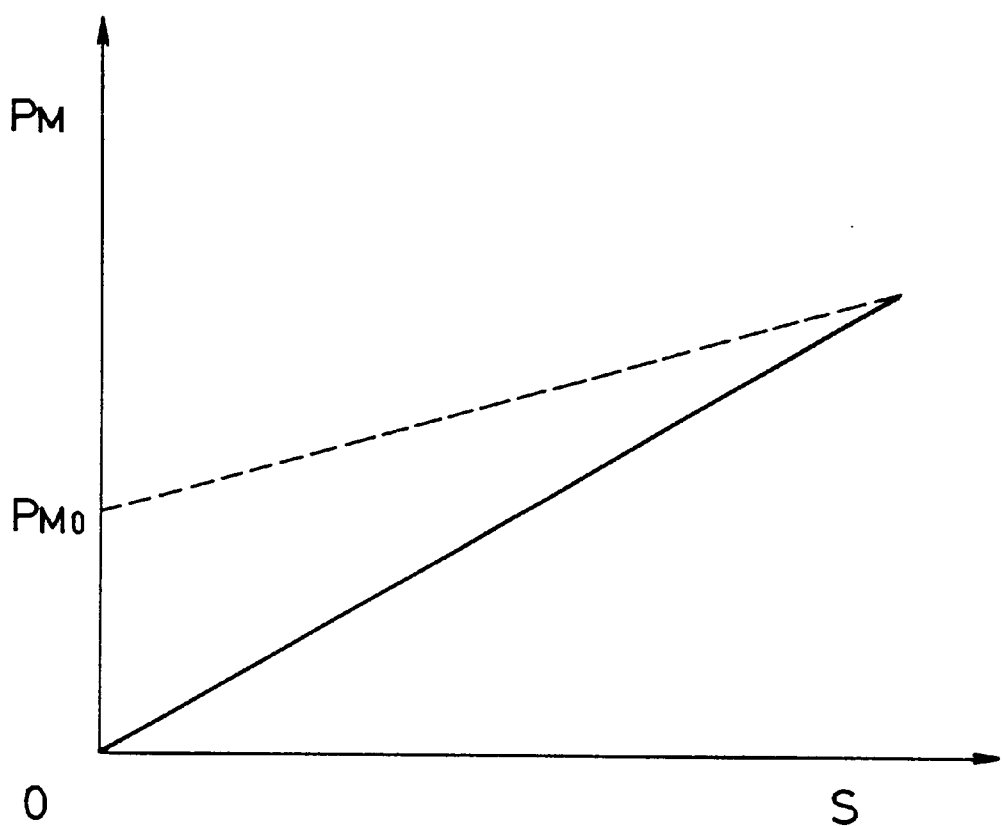
FIG. 2 is a graph showing the relation between the step-in stroke of the brake pedal and the master cylinder hydraulic pressure after stoppage of the vehicle in the brake system of FIG. 1.

At this time, the controller 17 controls the degree of opening of the solenoid valve 12 based on the pedal depressing stroke S detected by the stroke sensor 14, and the master cylinder hydraulic pressure PM detected by the pressure sensor 15a. That is, the amount of brake fluid discharged into the relief passage 13 is adjusted so that the the detected master cylinder pressure PM will coincide with the characteristic curve of the stroke simulator 9 shown by solid line in FIG. 2 (that is, mock master cylinder pressure PM produced by the stroke simulator 9 for the pedal depressing stroke S).

Instead of the master cylinder hydraulic pressure PM, the brake hydraulic pressure PW detected by the pressure sensor 15b may be conformed to the characteristic curve. If the solenoid valve 12 is not opened upon release of the brake operation, the master cylinder hydraulic pressure PM will be higher than the characteristic curve of the stroke simulator 9 by an amount equal to brake fluid flowing backward from the wheel cylinder 4 as shown by chain line in FIG. 2, so that a residual pressure PM0 will be produced when the pedal stroke becomes zero.

Thus, even after stop of the vehicle, the driver can get the same brake feeling as during traveling. Also, no residual pressure will be produced in the master cylinder 8 after release of the brake operation, thus no damage to a cup seal of the master cylinder 8.

Figure 3:
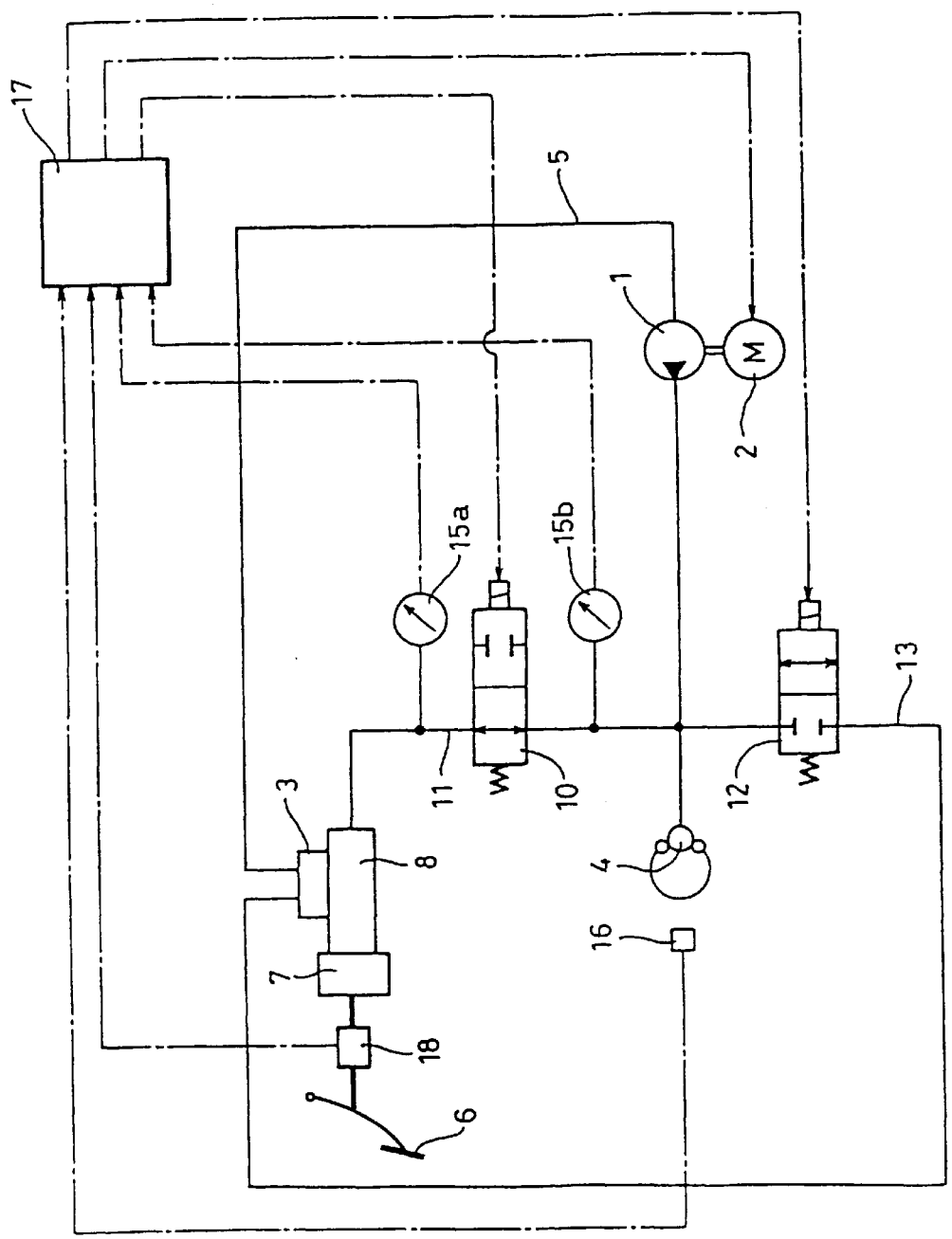
FIG. 3 is a circuit diagram of a brake system to which is applied a control method of a second embodiment.

FIG. 3 shows a vehicle hydraulic brake system to which the control method of the second embodiment is applied. In this brake system, to the brake pedal 6, a load sensor 18 as a brake operating force detecting means for detecting the pedal depressing force is mounted. Its detection signal is entered into the controller 17. Other portions are the same as with the brake system used in the first embodiment except that there is no stroke simulator 9 or stroke sensor 14. Thus they are indicated by the same reference signs as in FIG. 1.

The control of the brake system by the controller 17 in this embodiment is the same as in the first embodiment in a normal travel mode and when the vehicle stops. That is to say, the stoppage of the vehicle is detected by the signal from the sensor 16, the motor 2 is stopped, and when the hydraulic pressure difference between the master cylinder hydraulic pressure PM and the brake hydraulic pressure PW detected by the respective pressure sensors 15a and 15b drops below the predetermined threshold 0.2 MPa, the solenoid valve 10 is opened to bring the master cylinder 8 and the wheel cylinder 4 into communication with each other.

In this embodiment, when the depressing force to the brake pedal 6 is released, the controller 17 detects the release of the brake by the detection signal from the load sensor 18, and releases brake fluid in the wheel cylinder 4 into the relief passage 13 by opening the solenoid valve 12 so that no residual pressure will be produced in the master cylinder 8.

As described above, in the method of controlling a vehicle hydraulic brake system according to this invention, vehicle stoppage detecting means for detecting the stoppage of the vehicle is provided, and when the vehicle stoppage detecting means detects stoppage of the vehicle, the driving device for the hydraulic pressure source is deactivated and the on-off valve in the master cylinder passage is opened. Thus, even when the vehicle stops and the surroundings become quiet, no irritating noises or vibrations will be produced or electric power will not be wasted.

When the pressure difference between the hydraulic pressure in the master cylinder detected by the master cylinder hydraulic pressure detecting means and the brake hydraulic pressure detected by the brake hydraulic pressure detecting means is below a predetermined threshold, the on-off valve in the master cylinder passage is opened. Thus it is possible to prevent sharp reverse flow of brake fluid from the wheel cylinder into the master cylinder, sharp outflow of brake fluid from the master cylinder into the wheel cylinder, a kickback in the brake operating member, or sinking of the brake operating member, all resulting from the opening of the on-off valve in the master cylinder passage.

By opening the on-off valve in the master cylinder passage when the release of the brake operating member is detected by the detection signal from the brake operating force detecting means or the separately provided brake operating amount detecting means, it is possible to prevent residual pressure from being produced in the master cylinder. Thus, there is no possibility of damaging the cup seal by residual pressure. Thus there is no need to use an expensive mechanical seal as the seal of the master cylinder.

Also, if a stroke simulator having a brake fluid absorbing chamber is provided into communication with the master cylinder, by providing a brake operating amount detecting means, detecting control tending toward release of the brake operating member by the detection signal of the brake operating amount detecting means, opening the on-off valve in the relief passage, and by controlling the degree of opening of the on-off valve in the relief passage so that the hydraulic pressure in the master cylinder detected by the master cylinder hydraulic pressure detecting means or the brake hydraulic pressure detected by the brake hydraulic pressure detecting means will be a predetermined hydraulic pressure corresponding to the brake operating amount detected by the brake operating amount detecting means, it is possible to prevent damage to the cup seal and to obtain the same brake feelings as during travel even after stoppage of the vehicle.

What is claimed is:

1. A method of controlling a vehicle hydraulic brake system comprising a brake operating member, a master cylinder for producing hydraulic pressure corresponding to a brake operating force applied to said brake operating member, a wheel cylinder, a hydraulic pressure source for producing brake hydraulic pressure in said wheel cylinder, a driving device for said hydraulic pressure source, a fluid passage bringing said hydraulic pressure source and said wheel cylinder into communication with each other, a master cylinder passage bringing said master cylinder and said wheel cylinder into communication with each other through a first on-off valve, a relief passage having a second on-off valve for releasing pressure in said wheel cylinder into a reservoir by opening said second on-off valve, and a brake operating force detector that detects the brake operating force applied to said brake operating member, wherein while said hydraulic pressure source functions normally, the first on-off valve in said master cylinder passage is closed, and said driving device for said hydraulic pressure source is actuated based on a detection signal from said brake operating force detector, characterized in that a vehicle stoppage detector that detects stoppage of a vehicle is provided, and when said vehicle stoppage detector detects stoppage of the vehicle, said driving device for said hydraulic pressure source is stopped and the first on-off valve in said master cylinder passage is opened;

wherein the brake operating force detector is a master cylinder hydraulic pressure detector that detects hydraulic pressure produced in said master cylinder, and a brake hydraulic pressure detector that detects the brake hydraulic pressure in said wheel cylinder is provided, and, while said vehicle stoppage detector is detecting stoppage of the vehicle, if the pressure difference between the hydraulic pressure in the master cylinder detected by said master cylinder hydraulic pressure detector and the brake hydraulic pressure detected by said brake hydraulic pressure detector is below a predetermined threshold, the first on-off valve in said master cylinder passage is opened, and if the pressure difference between the hydraulic pressure in the master cylinder detected by said master cylinder hydraulic pressure detector and the brake hydraulic pressure detected by said brake hydraulic pressure detector is not below said predetermined threshold, the first on-off valve in the master cylinder passage is not opened.

2. A method of controlling a vehicle hydraulic brake system comprising a brake operating member, a master cylinder for producing hydraulic pressure corresponding to a brake operating force applied to said brake operating member, a wheel cylinder, a hydraulic pressure source for producing brake hydraulic pressure in said wheel cylinder, a driving device for said hydraulic pressure source, a fluid passage bringing said hydraulic pressure source and said wheel cylinder into communication with each other, a master cylinder passage bringing said master cylinder and said wheel cylinder into communication with each other through a first on-off valve, a relief passage having a second on-off valve for releasing pressure in said wheel cylinder into a reservoir by opening said second on-off valve, and a brake operating force detector that detects the brake operating force applied to said brake operating member, wherein while said hydraulic pressure source functions normally, the first on-off valve in said master cylinder passage is closed, and said driving device for said hydraulic pressure source is actuated based on a detection signal from said brake operating force detector, characterized in that a vehicle stoppage detector that detects stoppage of a vehicle is provided, and when said vehicle stoppage detector detects stoppage of the vehicle, said driving device for said hydraulic pressure source is stopped and the first on-off valve in said master cylinder passage is opened;

wherein, while the vehicle stoppage detector is detecting stoppage of the vehicle and while the first on-off valve in the master cylinder passage is open, when the release of said brake operating member is detected by a detection signal from said brake operating force detector, or by a detection signal from a separately provided brake operating amount detector that detects a brake operating force amount of said brake operating member, the second on-off valve in said relief passage is opened.

3. A method of controlling a vehicle hydraulic brake system comprising a brake operating member, a master cylinder for producing hydraulic pressure corresponding to a brake operating force applied to said brake operating member, a wheel cylinder, a hydraulic pressure source for producing brake hydraulic pressure in said wheel cylinder, a driving device for said hydraulic pressure source, a fluid passage bringing said hydraulic pressure source and said wheel cylinder into communication with each other, a master cylinder passage bringing said master cylinder and said wheel cylinder into communication with each other through a first on-off valve, a relief passage having a second on-off valve for releasing pressure in said wheel cylinder into a reservoir by opening said second on-off valve, and a brake operating force detector that detects the brake operating force applied to said brake operating member, wherein while said hydraulic pressure source functions normally, the first on-off valve in said master cylinder passage is closed, and said driving device for said hydraulic pressure source is actuated based on a detection signal from said brake operating force detector, characterized in that a vehicle stoppage detector that detects stoppage of a vehicle is provided, and when said vehicle stoppage detector detects stoppage of the vehicle, said driving device for said hydraulic pressure source is stopped and the first on-off valve in said master cylinder passage is opened;

wherein a stroke simulator having a brake fluid absorbing chamber is provided in communication with said master cylinder, the brake operating force detector that is also a master cylinder hydraulic pressure detector that detects the hydraulic pressure produced in said master cylinder or a brake hydraulic pressure detector that detects the brake hydraulic pressure in said wheel cylinder, and a brake operating amount detector that detects the brake operating amount of said brake operating member are provided, and when an operation tending toward release of said brake operating member is detected by the detection signal from said brake operating amount detector, the second on-off valve in said relief passage is opened, and the degree of opening of the second on-off valve in said relief passage is controlled such that the hydraulic pressure in the master cylinder detected by said master cylinder hydraulic pressure detector or the brake hydraulic pressure detected by said brake hydraulic pressure detector becomes a predetermined hydraulic pressure corresponding to the brake operating amount detected by said brake operating force detector.

4. The method of controlling a vehicle hydraulic brake system as claimed in claim 1 wherein, while the vehicle stoppage detector is detecting stoppage of the vehicle and while the first on-off valve in the master cylinder passage is open, when the release of said brake operating member is detected by the detection signal from said brake operating force detector, or by the detection signal from a separately provided brake operating amount detector that detects the brake operating force amount of said brake operating member, the second on-off valve in said relief passage is opened.

5. The method of controlling a vehicle hydraulic brake system as claimed in claim 1 wherein a stroke simulator having a brake fluid absorbing chamber is provided in communication with said master cylinder, the brake operating force detector that is also a master cylinder hydraulic pressure detector that detects the hydraulic pressure produced in said master cylinder or a brake hydraulic pressure detector that detects the brake hydraulic pressure in said wheel cylinder, and a second brake operating amount detector that detects the brake operating amount of said brake operating member are provided, and when an operation tending toward release of said brake operating member is detected by the detection signal from said second brake operating amount detector, the second on-off valve in said relief passage is opened, and the degree of opening of the second on-off valve in said relief passage is controlled such that the hydraulic pressure in the master cylinder detected by said master cylinder hydraulic pressure detector or the brake hydraulic pressure detected by said brake hydraulic pressure detector becomes a predetermined hydraulic pressure corresponding to the brake operating amount detected by said brake operating force amount detector.

6. A method of controlling a vehicle hydraulic brake system, said system comprising a brake operating member, a master cylinder for producing hydraulic pressure corresponding to brake operating force applied to said brake operating member, a wheel cylinder, a hydraulic pressure source for producing hydraulic pressure, a driving device for driving said hydraulic pressure source, a fluid passage connecting said hydraulic pressure source to said wheel cylinder for applying hydraulic pressure produced by the hydraulic pressure source to the wheel cylinder, at least one master cylinder passage having a first on-off valve for bringing said master cylinder into fluid communication with said wheel cylinder when said first on-off valve is opened, said master cylinder being completely shut off from said wheel cylinder while said first on-off valve is closed, and a relief passage having a second on-off valve for releasing pressure in said wheel cylinder into a reservoir when said second on-off valve is opened, said method comprising:

closing said first on-off valve and producing hydraulic pressure corresponding to the pressure in the master cylinder in said wheel cylinder by activating said driving device, while a vehicle is moving and said brake operating member is being operated;

determining whether or not the wheel cylinder pressure is sufficient compared with the master cylinder pressure;

continuously closing said first on-off valve and producing hydraulic pressure corresponding to the master cylinder pressure in said wheel cylinder by activating said driving device, as long as the vehicle is moving, said brake operating member is being operated, and the wheel cylinder pressure is determined to be sufficient compared with the master cylinder pressure;

opening said first on-off valve only if the wheel cylinder pressure is determined to be insufficient compared with the master cylinder pressure while the vehicle is moving and said brake operating member is being operated; and opening said first on-off valve and deactivating said driving device when the vehicle has been brought to a stop with said first on-off valve closed and said brake operating member being operated.

* * * * *